United States Patent [19]

Harris

[11] Patent Number: 4,671,150
[45] Date of Patent: Jun. 9, 1987

[54] APPARATUS AND METHOD FOR CUTTING PIPE INTO SMALL PIECES

[75] Inventor: Michael R. Harris, Plano, Tex.

[73] Assignee: Phillips Petroleum Company, Bartlesville, Okla.

[21] Appl. No.: 708,206

[22] Filed: Mar. 4, 1985

[51] Int. Cl.$^4$ .................... B23D 21/02; B23D 27/00
[52] U.S. Cl. .................................. 83/49; 83/54; 83/355; 83/596; 83/916
[58] Field of Search ............... 83/49, 54, 916, 596, 83/595, 671, 906, 349, 355

[56] References Cited

U.S. PATENT DOCUMENTS

| | | | |
|---|---|---|---|
| 1,756,171 | 4/1930 | Bommer. | |
| 2,646,832 | 7/1953 | Papendick | 83/906 X |
| 2,650,663 | 9/1953 | Wales et al. | 164/47 |
| 3,360,204 | 12/1967 | Merges et al. | 241/73 |
| 3,587,373 | 6/1971 | Astrand | 83/49 X |
| 4,006,527 | 2/1977 | Sivachenko | 30/241 |
| 4,015,782 | 4/1977 | Granite | 241/62 |
| 4,068,695 | 1/1978 | Seaman | 144/312 |
| 4,115,000 | 9/1978 | Mischo et al. | 83/671 X |
| 4,388,847 | 6/1983 | Stoeckli | 83/49 X |
| 4,408,976 | 10/1983 | Parker | 425/301 |
| 4,474,095 | 10/1984 | Heck | 83/54 X |

OTHER PUBLICATIONS

"Scrap-Reduction System Enables Immediate Reuse of Regrind or Powders", *Process Engineering News*, (Nov. 1977), pp. 29 and 31.
"New Granulator Rotor 'Eats Anything' But Doesn't Gobble Energy", *Process Engineering News*, (Mar. 1980), pp. 31 and 33.
"Granulator Designs", *Plastics World*, (Mar. 1979), pp. 34-35.

*Primary Examiner*—Frank T. Yost
*Attorney, Agent, or Firm*—William R. Sharp

[57] ABSTRACT

An apparatus and method for cutting a pipe into a multiplicity of small pieces are provided wherein the pipe is fed by rotating the pipe about its longitudinal axis and simultaneously moving the pipe in a direction generally parallel to the longitudinal axis of the pipe, and wherein individual pieces are sequentially cut from an end of the pipe as it is being fed.

7 Claims, 2 Drawing Figures

APPARATUS AND METHOD FOR CUTTING PIPE INTO SMALL PIECES

This invention relates to an apparatus for cutting pipe into a multiplicity of small pieces. In another aspect, the invention relates to a method of cutting a pipe into many pieces or chunks.

It is well known to extrude thermoplastic piping that has the internal diameter of 1 to 6feet which has side walls of thicknesses as great as 1½ or 2 inches. As in every manufacturing process, in the natural course of events, sufficient scrap and off-specification, extruded piping is produced to warrant a recovery of the thermoplastic for reprocessing. Unfortunately, because side walls are progressively thickened as the diameter of the extruded pipe is increased, thermoplastic piping having a diameter greater than 6 inches becomes progressively more difficult to reprocess to the granular form necessary for proper mixing and reworking as an extruder feed.

Some of the presently used methods for preparing larger diameter pipe for reprocessing require excessive amounts of manual labor in crosscutting and re-crosscutting sections of piping until pieces small enough to be easily handled by the normal granulating equipment are attained.

SUMMARY OF THE INVENTION

It is therefore an object of this invention to provide an apparatus and method for cutting a pipe into many small pieces.

It is also an object of the present invention to provide an apparatus and method which are capable of reducing a thick walled large diameter pipe into pieces of sufficiently small size so as to be easily processed in a granulator.

The above objects are realized in an apparatus and method wherein feeding of a pipe occurs by rotating the pipe about its longitudinal axis and simultaneously moving the pipe in a direction parallel to the longitudinal axis of the pipe. Individual pieces are sequentially cut from an end of the pipe as it is being fed such that the pipe may be reduced to a multiplicity of small pieces.

According to a preferred embodiment, the pipe may be fed by a plurality of rollers which are skewed with respect to the longitudinal axis of the pipe. The cutting is accomplished by a rotating rotor having a blade on the periphery thereof.

DESCRIPTION OF THE PREFERRED EMBODIMENTS

Figure 1:
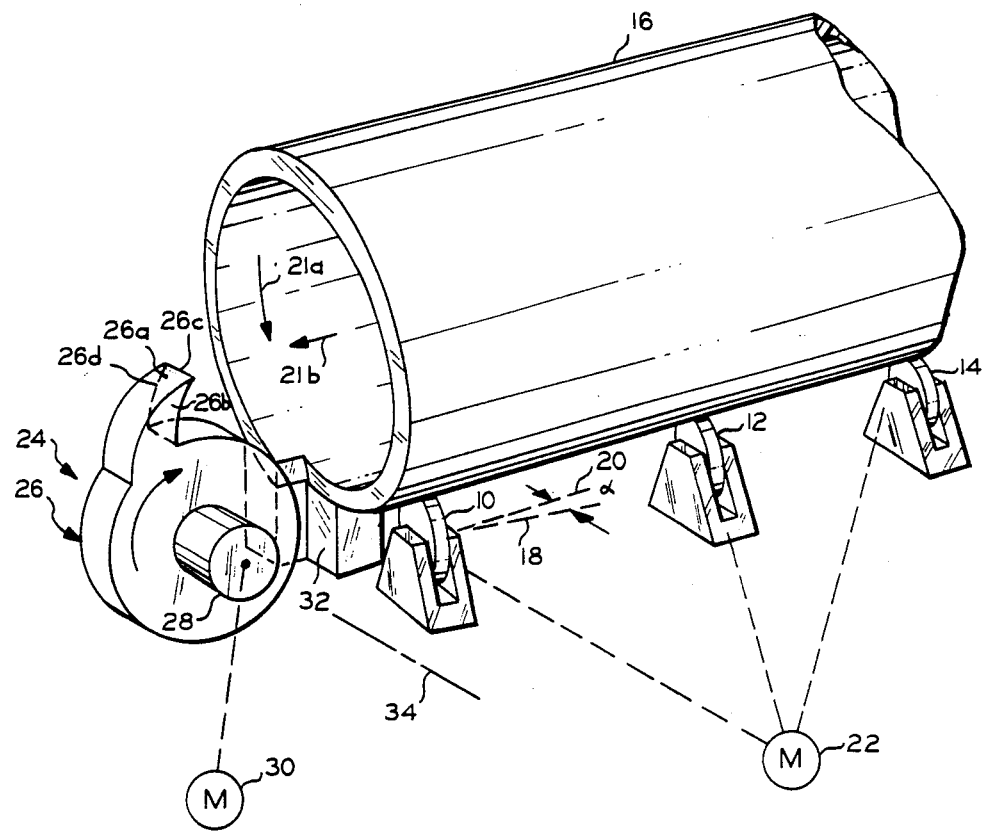
FIG. 1 is a pictorial view of an apparatus for cutting pipe into many pieces according to the present invention.

An embodiment of the present invention will now be described in reference to the FIGURES. It should be understood that various components of the apparatus shown are mounted on a suitably stable and strong support surface which is not shown. Additionally, values for various parameters such as rotational rate etc. given below are given solely by way of example for the case of large diameter pipes having diameters between about 1 and about 6 feet.

The illustrated apparatus employs a feed mechanism which includes a plurality of feed rollers, three of which are shown at 10, 12 and 14. The rollers are suitably positioned to receive a pipe 16 thereon. Rollers, which are not shown, are also provided on the opposite side of pipe 16. Each roller is mounted in any convenient manner so as to be capable of free rotation about a rotational axis, and is skewed in the illustrated embodiment with respect to the longitudinal axis of pipe 16. More precisely stated with reference to roller 10, the rotational axis of roller 10, shown at 18, forms an acute angle $\alpha$ in a horizontal plane with the longitudinal axis of pipe 16 which is resting on the rollers. A dashed line is shown at 20 which is parallel to the longitudinal axis of pipe 16. Preferably, a skew angle $\alpha$ is less than about five degrees, and is most typically about one or two degrees. Skewing of the rollers in this manner serves to impart to pipe 16 simultaneous rotational and longitudinal movement in respective directions as shown at 21a and 21b. The skew angle at which the rollers are set is preselected, and is determined according to the desired distance of longitudinal pipe travel per revolution, the distance so travelled being a function of the pipe diameter. For example, if a 48 inch diameter pipe is employed, and it is desired to move the pipe longitudinally 4 inches per revolution, the skew angle $\alpha$ would be set at 1.5 degrees. Most preferably, the rollers are mounted so that the skew angle can be readily adjusted. A conventional swivel base or other suitable means could be employed to accomplish this result. The illustrated feed mechanism also includes a motor shown schematically at 22, which functions to rotate the feed rollers through suitable drive links illustrated by the dashed lines connecting the rollers and motor 22. Each drive link might include a gear drive or any other suitable means for operably connecting the motor to each roller.

Although the illustrated embodiment utilizes rollers skewed with respect to the pipe longitudinal axis, it should be understood that alternative feed mechanisms which have the capability of both rotating and moving a pipe longitudinally would be within the scope of the present invention. For example, two different sets of rollers could be provided wherein one set functions to rotate the pipe, and the other set functions to move the pipe longitudinally.

A rotating type cutting mechanism is employed in the illustrated embodiment which is shown generally at 24. Cutting mechanism 24 includes a rotor 26, a shaft 28 coaxially mounted to rotor 26, a motor 30 operably connected to shaft 28 through a suitable drive link as shown by the dashed line, and a cutter backup member 32. In actual practice, motor 30 would be linked to shaft 28 through a speed reducer.

Rotor 26 has a rotational axis 34 generally perpendicular to the longitudinal feed direction shown at 21b, and is positioned to receive an end of pipe 16 as it is being fed by the feed rollers. Rotor 26 is essentially a disc shaped metallic, preferably steel, member having a diameter of preferably about 2 to about 4 feet, and a thickness of about 2 to about 4 inches.

A radially extending blade 26a is provided on the periphery of rotor 26 which serves as the operable cutting element in cutting a piece from the wall of pipe 16 as will be discussed in more detail below. Although only one blade is employed in the illustrated embodiment, it should be understood that any number of blades could be utilized around the periphery of rotor 26. However, if more than one blade is utilized, more horsepower will be required in motor 30 to furnish the necessary energy to make multiple cuts through the pipe wall for every revolution of the rotor. Only one blade is used in the illustrated embodiment since this requires the lowest energy input, and thus a less expensive lower horsepower motor. Speed of the cutting operation is preferably sacrificed in favor of a lower required energy input and lower cost.

Blade 26a has a leading surface shown at 26b which is designed to make a clean cut in the wall of pipe 16 with a minimum amount of energy expended as further discussed in connection with FIG. 2. Also as shown, leading surface 26b forms a portion of the edge surface of rotor 26. Leading surface 26b includes cutting edges 26c and 26d which act as the primary cutting surfaces which come into contact with the wall of pipe 16 in cutting a piece therefrom. Since these edges and areas immediately adjacent to these edges are subjected to an enormous amount of stress in the cutting operation, an insert (not shown) could be mounted in appropriate seats (not shown) at each of these edges as is known in the art. Such inserts would typically be a hard steel alloy with a high impact toughness or resistance. Since seats in which the inserts would be mounted also are subjected to forceful impacts, the material used for the main body of the rotor should be strong enough to maintain the seats in their mounted positions. Usually, a mild steel alloy will be sufficient for this purpose.

Motor 30 is preferably a DC adjustable motor, typically having between about 2 and about 5 horsepower. This relatively low horsepower is required largely because of the massive rotor which tends to act as a flywheel in storing the energy of the motor. If desired, shaft 28 could be extended and a flywheel in addition to the rotor could be mounted on the shaft. This would further increase the momentum of the system, and would decrease the likelihood of the rotor stalling after making a cut through the pipe wall. Such a flywheel should be mounted as close to the rotor as possible to minimize torsion stress on the shaft.

Backup member 32 is mounted such that its upper surface is closely adjacent to the exterior surface of pipe 16. Most preferably, the upper surface of backup member 32 is in sliding contact with the exterior surface of pipe 16. As shown, backup member 32 has a notch therein which is shaped to mate with and be complimentary to blade 26a. The backup member is also positioned with respect to the rotor so as to closely receive blade 26A through the notch upon rotation of the rotor. Most preferably, the amount of clearance between blade 26a and the notch in backup member 32 is no more than about one-eighth of an inch.

Figure 2:
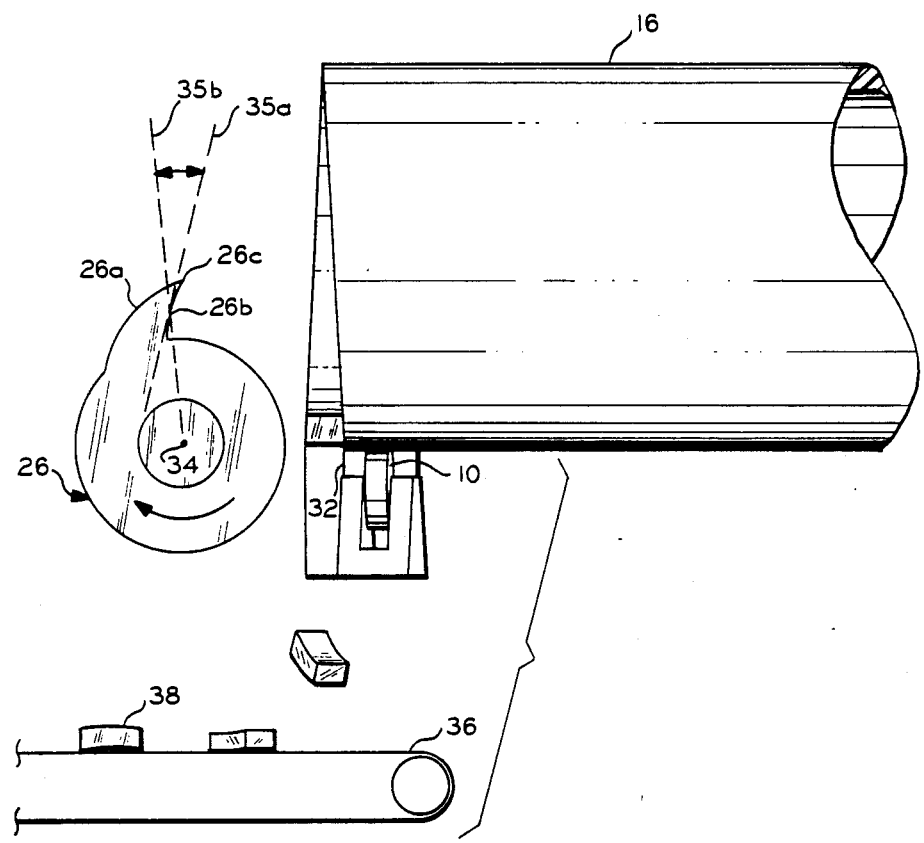
FIG. 2 is a side view of a portion of the apparatus shown in FIG. 1, and additionally schematically shows means for receiving and transporting pieces cut from the pipe.

Referring now to FIG. 2, a side view is shown of the apparatus illustrated in FIG. 1, wherein the preferred shape and orientation of blade 26a is clearly shown. As shown, leading surface 26b faces generally in the direction of rotation of rotor 26. Most preferably, leading surface 26b is shaped and oriented such that for substantially any point along the leading surface, a line tangent to the leading surface at a particular point, as shown for example at 35a, defines an acute angle with respect to a line intersecting the rotational axis and the point, as shown for example at 35b. Each of lines 35a and 35b lie in a rotational plane perpendicular to the rotational axis of the rotor. This design insures that substantially only the leading edge 26c of blade 26a initially comes into contact with the wall of pipe 16, such that the total force exerted on the pipe wall is concentrated on a very small surface area of the pipe wall so as to enable an easier and cleaner cut.

Although leading surface 26b is curved in the illustrated embodiment, the leading surface could alternatively lie in a single plane.

Also shown schematically in FIG. 2 is a conveyor 36 positioned under the end of pipe 16 for receiving pieces such as shown at 38, which have been cut from the pipe. Conveyor 36 serves to transport pieces 38 to additional reprocessing equipment as will be further discussed.

The illustrated apparatus operates as follows. First, pipe 16 is suitably placed on the feed rollers. Motors 22 and 30 are started to put the feed rollers and rotor in motion. Rotation of the feed rotors causes pipe 16 to simultaneously rotate about its longitudinal axis and move in a direction parallel to the pipe longitudinal axis as indicated. The pipe is accordingly fed end first both rotationally and longitudinally towards rotating rotor 26 which rotates in the direction indicated.

As noted above, the longitudinal velocity of the pipe is a function of pipe diameter, the feed roller rotation rate and feed roller skew angle. Typically, the longitudinal velocity of pipe 16 is from about 2 inches to about 5 inches per minute. It should also be noted that the longitudinal distance travelled during one revolution of the pipe generally corresponds to the length of each piece cut from the pipe wall, wherein length is measured along a line parallel to the pipe longitudinal axis. Preferably, the rotational rates of rotor 26 and the feed rollers are interrelated so that for one revolution of the rotor, the pipe wall rotates through an arc having a chord length substantially equivalent to the thickness of the rotor. Utilizing such rotational rates, a section of the pipe wall equivalent to the thickness of blade 26a is presented to the blade on each revolution of the rotor. This condition is however not necessary, if for some reason on each cut it is desirable to cut from the wall a piece having a width less than the thickness of the blade. Such a situation might arise if the horsepower of the motor is insufficient to cut a full sized piece from the pipe wall. Of course, the rotational rates can be adjusted in view of the above considerations. A typical rotational rate for rotor 26 is between about 10 RPM and 30 RPM, and the pipe 16 is typically rotated at about 1 RPM to about 2 RPM.

Preferably, the rotor 26 and pipe 16 are rotated at predetermined and substantially constant rotational rates, and the pipe is also moved longitudinally in direction 21a at a predetermined and substantially constant velocity such that pieces cut from the pipe are substantially uniform in size.

The rotor 26 and associated blade 26a act to sequentially cut individual pieces from the wall of the pipe at one end as it is being fed, as will now be explained in detail. The first piece cut from the wall of pipe 16 is a very small increment or sliver. After one additional revolution of rotor 26, blade 26a then cuts a slightly longer piece from the wall of pipe 16. Similarly, as the pipe simultaneously rotates and moves in a longitudinal direction, progressively longer and thus larger pieces are cut from the wall of pipe 16. After one revolution of pipe 16, the end of the pipe takes on a generally spiral shape substantially as shown in FIG. 1 and FIG. 2. Thereafter, each cut of blade 26a produces a relatively uniform piece from the wall of the pipe. The spiral shape of the end of pipe 16 is maintained throughout the cutting operation. The end of pipe 16 subjected to the cutting operation is actually somewhat jagged but is shown as smooth in FIG. 1 for ease of illustration.

Thus, pipe 16 can be fed through the apparatus along its entire length so as to cut the pipe into a multiplicity of small pieces. Typical dimensions for each piece as shown at 38 range between about 2 inches×2 inches and about 4 inches×4 inches.

Pieces cut from the wall of pipe 16 can simply be dropped to conveyor 36, or other suitable transport means, which carries the pieces to a granulator (not shown). The granulator then granulates these pieces in a conventional fashion. The granular product can then be used as a feed to an extruder (not shown) which is employed to produce a new pipe product.

An apparatus constructed according to the present invention can be left unattended while operating, thus requiring very little labor or expense. Moreover, there is no need to make major adjustments in the apparatus when changing from one size pipe to another size pipe. Such a feature is very desirable where many sizes of pipe are being fed through the apparatus. Since the longitudinal velocity of pipe 16 is related to its diameter, however, the size of the pieces produced will vary somewhat with different pipe sizes if the apparatus is not adjusted. Another advantageous feature of the invention is the fact that the blade on the rotor must travel through only one pipe wall thickness for each revolution of the rotor. This arrangement is very much preferred over one in which the blade must pass through two pipe wall thicknesses, since this can cause stalling of the rotor and/or damage to the drive equipment for the rotor.

A calculated example will now be given which should not be construed to limit the invention in any manner. Set forth below are a set of apparatus dimensions and operating conditions for an embodiment constructed according to FIGS. 1 and 2. It is calculated that an apparatus constructed and operated according to this example will produce a 4 inch×4 inch piece every 2 seconds.

| | |
|---|---|
| Diameter of pipe | 48 inches |
| Skew angle of feed rollers | 1.5° |
| Rotor - | |
| Thickness | 4 inches |
| Diameter | 2 feet |
| Rotational rate of rotor | 30 RPM |
| Rotational rate of pipe | .8 RPM |
| Longitudinal velocity of pipe | 3.14 inches/minute |

Obviously many modifications and variations of the present invention are possible in light of the above teachings. It is therefore to be understood that within the scope of the appended claims the invention may be practiced otherwise than as specifically described.

That which is claimed is:

1. An apparatus for cutting a pipe having a wall into a multiplicity of small pieces comprising:
   feed means for feeding the pipe by rotating the pipe about its longitudinal axis and simultaneously moving the pipe in a feed direction generally parallel to the longitudinal axis of the pipe; and
   cutting means positioned to receive an end of the pipe being fed by said feed means, said cutting means being adapted to sequentially cut individual pieces from the wall of the pipe at said end as it is being fed such that the pipe may be reduced to a multiplicity of small pieces, wherein said cutting means includes a rotor having a rotational axis generally perpendicular to said feed direction, said rotor including at least one radially extending blade on the periphery thereof, said cutting means further including a means for rotating said rotor about said rotational axis.

2. An apparatus as recited in claim 1 which further includes a backup member positioned to be closely adjacent to the exterior surface of a pipe being fed by said feed means, said backup support member having a notch therein which is shaped to mate with and be complimentary to said blade, and wherein said member is positioned with respect to said rotor so as to closely receive said blade through said notch upon rotation of said rotor.

3. An apparatus as recited in claim 2, wherein said blade has a leading surface which faces generally in the direction of rotation of said rotor, and wherein for substantially any point along said leading surface, a line tangent to said leading surface at said point defines an acute angle with respect to a line intersecting said rotational axis and said point where said tangent line and said intersecting line lie in a rotational plane perpendicular to said rotational axis.

4. An apparatus as recited in claim 3, wherein said feed means comprises: a plurality of feed rollers, said feed rollers being positioned to receive the pipe thereon and wherein each roller has a rotational axis which forms an acute angle in a horizontal plane with the longitudinal axis of a pipe resting on said rollers; a means for rotating said rollers.

5. An apparatus as recited in claim 4, wherein the acute angle the rotational axis forms with the pipe longitudinal axis is less than about 5 degrees.

6. A method of cutting a pipe having a wall into a multiplicity of small pieces comprising:
   feeding the pipe by rotating the pipe about its longitudinal axis and simultaneously moving the pipe in a feed direction generally parallel to the longitudinal axis of the pipe; and
   sequentially cutting individual pieces from the wall of the pipe at an end thereof as the pipe is being fed, wherein said cutting is performed by a rotating rotor having at least one blade on the periphery thereof, said blade cutting through only one pipe wall thickness per revolution of said rotor.

7. A method as recited in claim 7 wherein said rotor and pipe are rotated at predetermined and substantially constant rotational rates, and the pipe is moved in said feed direction at a predetermined and substantially constant velocity, whereby pieces cut from the pipe are substantially uniform in size.

* * * * *